Patented June 12, 1945

2,378,366

UNITED STATES PATENT OFFICE 2,378,366

ROSIN - MODIFIED PHENOL - FORMALDE-HYDE RESIN COATING COMPOSITIONS

Robert C. Swain, Riverside, and Pierrepont Adams, Stamford, Conn., assignors to American Cyanamid Company, New York, N. Y., a corporation of Maine No Drawing. Application December 5, 1940, Serial No. 368,634

4 Claims. (Cl. 260—25)

This invention relates to coating compositions containing rosin-modified phenol-formaldehyde resin and melamine-formaldehyde resins.

An object of this invention is to improve the physical and chemical properties of coating compositions containing rosin-modified phenol-formaldehyde resin, e. g., acid resistance, solvent resistance, heat resistance, etc.

Another object of this invention is to provide compositions containing rosin-modified phenol-formaldehyde resin and compatible proportions of compatible melamine-formaldehyde resins.

These and other objects are attained by blending rosin-modified phenol-formaldehyde resin with a melamine-formaldehyde resin which has been alkylated with an alcohol containing at least 4 carbon atoms wherein the molal ratio of formaldehyde to melamine is at least about 4:1.

The following examples in which the proportions are in parts by weight are given by way of illustration and not in limitation.

Example 1

| | Parts |
|---|---|
| Melamine-formaldehyde resin "A" | 10 |
| Rosin-modified phenol-formaldehyde resin | 90 |

A composition containing these ingredients is prepared by admixing 20 parts of melamine-formaldehyde resin "A" solution (50% resin) with 180 parts of "rosin-modified phenol-formaldehyde resin stock solution" (containing 50% of rosin-modified phenol-formaldehyde resin and 50% of xylene). Films of the composition are applied to metal objects and baked at a temperature of about 135° C. for about one-half hour. The product is a hard, transparent coating having good film strength.

Example 2

| | Parts |
|---|---|
| Melamine-formaldehyde resin "B" | 25 |
| Rosin-modified phenol-formaldehyde resin | 75 |

A composition containing these ingredients is prepared by admixing 50 parts of melamine-formaldehyde "resin" B solution (50% resin) with 150 parts of "rosin-modified phenol-formaldehyde resin stock solution. Films of the composition are applied to metal objects and baked at a temperature of about 135° C. for about one-half hour. The product formed is a very hard, clear coating.

Example 3

| | Parts |
|---|---|
| Melamine-formaldehyde resin "B" | 75 |
| Rosin-modified phenol-formaldehyde resin | 25 |

A composition containing these ingredients is prepared by admixing 150 parts of melamine-formaldehyde resin "B" solution (50% resin) with 50 parts of "rosin-modified phenol-formaldehyde resin stock solution. Films of the composition are applied to metal objects and baked at a temperature of about 135° C. for about one-half hour. A clear, tough film is formed.

Example 4

| | Parts |
|---|---|
| Melamine-formaldehyde resin "C" | 50 |
| Rosin-modified phenol-formaldehyde resin | 50 |

A composition containing these ingredients is prepared by admixing 100 parts of melamine-formaldehyde resin "C" solution (50% resin) with 100 parts of "rosin-modified phenol-formaldehyde resin stock solution." Films of the composition are applied to metal objects and baked at a temperature of about 135° C. for about one-half hour. A water-white film having good chemical properties is formed.

Example 5

| | Parts |
|---|---|
| Melamine-formaldehyde resin "D" | 90 |
| Rosin-modified phenol-formaldehyde resin | 10 |

A composition containing these ingredients is prepared by admixing 180 parts of melamine-formaldehyde resin "D" solution (50% resin) with 20 parts of "rosin-modified phenol-formaldehyde resin stock solution." Films of the composition are applied to metal objects and baked at a temperature of about 135° C. for about one-half hour. A hard, transparent film is produced.

The rosin-modified phenol-formaldehyde resins used in the above examples may be prepared by heating with agitation rosin and a phenol-formaldehyde condensate until the water of condensation is distilled off, optionally adding a relatively small proportion of an α,β-unsaturated polycarboxylic acid such as fumaric or maleic acid and finally esterifying the product with an alcohol such as glycerol.

*Preparation of melamine-formaldehyde resin "A"*

| | Parts |
|---|---|
| Melamine (1 mol) | 126 |
| Formalin (4 mols) (37% formaldehyde in water) | 324.4 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning perferably about after 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "B"*

| | Parts |
|---|---|
| Melamine | 283 |
| Formalin (37% formaldehyde in water) | 978 |

This mixture is heated at about 70–80° C. until a homogeneous solution is obtained. The pH is adjusted to about 7.3 with caustic soda and vacuum concentrated to remove about 50–60% of the free water. Sufficient phosphoric acid is added to neutralize the caustic soda present and then 320 parts of methanol are added. Wet methanol is gradually distilled off from the mixture and dry methanol is added at about the same rate as wet methanol is distilled off. This distillation and addition of methanol is continued until the distillate is substantially dry methanol. During this operation which requires about 4 hours, about 1600 parts of methanol are added. 707 parts of "Pentasol" (trade name of Sharples Solvents Corporation for mixed amyl alcohols) are added and the distillation is continued until the vapor temperature rises to about 100–105 C. About 710 parts of the distillate are collected. The pressure is lowered sufficiently to reduce the temperature to 80–90° C. and 178 parts more of the distillate are collected, leaving as a product a resin solution containing 50% of resin solids in "Pentasol."

*Preparation of melamine-formaldehyde resin "C"*

| | Parts |
|---|---|
| Melamine (1 mol) | 126 |
| Formalin (5 mols) (37% formaldeyde in water) | 405.5 |
| n-Hexyl alcohol | 500 |
| Methyl alcohol | 200 |

The mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 80–85° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. This solution is essentially a hexylated resin in hexyl alcohol, all or nearly all of the methanol having been eliminated from it during the distillation. The resulting resin solution may be diluted to about 50% solids with any desired solvent or diluent, e. g., xylene.

*Preparation of melamine-formaldehyde resin "D"*

| | Parts |
|---|---|
| Melamine (1 mol) | 126 |
| Formalin (5 mols) (37% formaldehyde in water) | 405.5 |
| Benzyl alcohol | 600 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 93–95° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

Alkylated melamine-formaldehyde resins may be produced in accordance with the procedures outlined above, as well as in any other suitable manner. Aqueous syrups of melamine-formaldehyde resins may be first produced and then alkylated either simultaneously with dehydration or subsequent to dehydration. Generally the simultaneous condensation of melamine, formaldehyde and a suitable alcohol is used because of convenience. In order to facilitate the alkylation with the higher alcohols, e. g., the amyl alcohols, hexyl alcohols and the octanols, a low boiling alcohol such as methanol or butanol may be mixed with the higher alcohol, thereby assisting in removing the water and causing the reaction to take place readily at somewhat lower temperatures than would otherwise be required. The low boiling alcohol is removed by distillation after the reaction is completed. Another method for producing resins alkylated with a higher alcohol is to alkylate the melamine-formaldehyde resin with a low boiling alcohol such as methanol and subsequently replacing it with the desired higher alcohol, distilling out the low boiling alcohol. The condensation may be carried out either with or without an acid catalyst and in some instances basic catalysts may desirably be utilized.

The melamine-formaldehyde resins vary slightly according to minor variations in control during their production and in some instances small proportions of a suitable solvent material, e. g., benzene, toluene, xylene, mineral spirits, etc., may be added to the original solutions of rosin-modified phenol-formaldehyde resin and melamine-formaldehyde resin in order to produce perfectly clear solutions if such solutions are not originally obtained.

While formaldehyde has been used in the previous example, it will be obvious that the various polymers of formaldehyde, e. g., paraformaldehyde, or substances which yield formaldehyde may be used in place of part or all of the formaldehyde.

As indicated by the above examples, rosin-modified phenol-formaldehyde resins have been found to be compatible with melamine-formaldehyde resins alkylated with an alcohol containing at least 4 carbon atoms wherein the molal ratio of formaldehyde to melamine is at least about 4:1. Butylated melamine resins wherein the molal ratio of formaldehyde to melamine is 3:1 are compatible in proportions up to about 40% with rosin-modified phenol-formaldehyde resin while melamine-formaldehyde resins which have been alkylated with butyl alcohol wherein the molal ratio of formaldehyde to melamine is 2.5:1 are only compatible in proportions up to about 20%. Surprisingly enough, melamine resins which are alkylated with ethyl alcohol wherein the molal ratio of formaldehyde to melamine is about 5:1 are compatible in proportions less than 20% and greater than 80%. While higher ratios of formaldehyde to melamine than 6:1 may be used, it is generally undesirable inasmuch as formaldehyde is lost during the curing so that usually the product in its cured condition does not contain more than about 6 mols of formaldehyde to 1 mol of melamine. The percentage composition in each instance in this paragraph is on a total solids weight basis.

The resins may be alkylated with any of the straight chain or branched chain alcohols containing at least 4 carbon atoms, preferably 4–8 carbon atoms, as well as with alkyl types of alcohols such as benzyl alcohol. The term "alkylated melamine-formaldehyde resin" is intended to denote compositions which are reacted with an alcohol.

Our products may be plasticized with a wide variety of materials such as the alkyl phthalates, tricresyl phosphate, various alkyd resins, particularly the fatty oil acid modified alkyd resins, etc.

Various fillers, pigments, dyes and lakes may be added to our compositions, e. g., lithopone, zinc oxide, titanium oxide, ferric oxide, Prussian blue, toluidiene red, malachite green, mica, glass fibers, ground glass, powdered silica, etc.

Curing catalysts may be incorporated in the compositions to effect a more rapid curing of the melamine-formaldehyde resins or to enable the resin to be cured at lower temperatures than indicated in the above examples. Such substances are, for instance, phosphoric acid, ammonium salts of phosphoric acid, etc.

Other resinous compositions may be included in various coating compositions, e. g., urea-formaldehyde resins, alkyd resins, ethyl cellulose, cellulose acetate, nitrocellulose, etc., as well as in varnishes, especially drying oil varnishes, such as those from tung oil, linseed oil, etc.

Our mixed products show improved acid resistance, solvent resistance, heat resistance, etc., as compared to rosin-modified phenol-formaldehyde resin compositions not containing melamine-formaldehyde resins.

Our compositions are useful in the manufacture of paints, industrial enamels, pigmented primers, wall sealers, etc., and particularly in furniture finishes which require a quick-drying coating. Our mixed resins are especially suitable for use in floor finishes, where they offer excellent resistance to abrasion and constant scrubbing. Our products are valuable for use as railway and marine finishes because of their high water resistance and general outdoor durability. One advantage of our mixed products is their quick drying time and high gloss, rendering them particularly useful in printing inks.

The term "compatible" as used herein is intended to denote compositions, films of which are clear and homogeneous after baking.

Obviously many modifications and variations in the processes and compositions described above may be made without departing from the spirit and scope of the invention as defined in the appended claims.

We claim:

1. A coating composition containing substantial amounts of rosin-modified phenol-formaldehyde resin and a melamine-formaldehyde resin which has been reacted by heating until condensed with a monohydric alcohol containing between 4 and 8 atoms, wherein the molal ratio of formaldehyde to melamine is at least about 4:1.

2. A coating composition containing substantial amounts of rosin-modified phenol-formaldehyde resin and a melamine-formaldehyde resin which has been reacted by heating until condensed with n-butanol wherein the molal ratio of formaldehyde to melamine is at least about 4:1.

3. A coating composition containing substantial amounts of rosin-modified phenol-formaldehyde resin and a melamine-formaldehyde resin which has been reacted by heating until condensed with n-hexyl alcohol wherein the molal ratio of formaldehyde to melamine is at least about 4:1.

4. A coating composition containing substantial amounts of rosin-modified phenol-formaldehyde resin and a melamine-formaldehyde resin which has been reacted by heating until condensed with benzyl alcohol wherein the molal ratio of formaldehyde to melamine is at least about 4:1.

ROBERT C. SWAIN.
PIERREPONT ADAMS.

CERTIFICATE OF CORRECTION.

Patent No. 2,378,366. June 12, 1945.

ROBERT C. SWAIN, ET AL.

It is hereby certified that error appears in the printed specification of the above numbered patent requiring correction as follows: Page 3, first column, line 47, for "alkyl" read --aralkyl--; and that the said Letters Patent should be read with this correction therein that the same may conform to the record of the case in the Patent Office.

Signed and sealed this 2nd day of October, A. D. 1945.

Leslie Frazer

(Seal) First Assistant Commissioner of Patents.